(No Model.) 3 Sheets—Sheet 3.
W. W. HARVEY.
CORN HARVESTER.
No. 458,365. Patented Aug. 25, 1891.
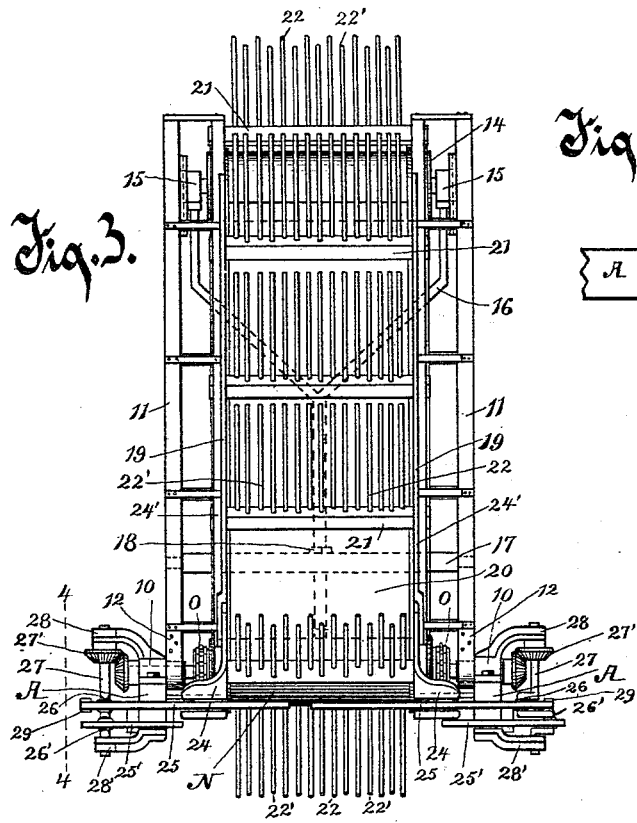
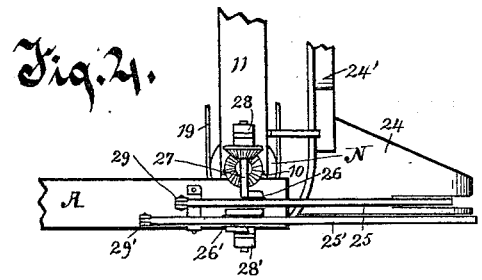
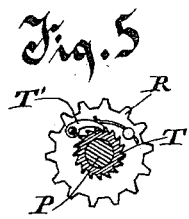
Witnesses.
Inventor.
Willis W. Harvey

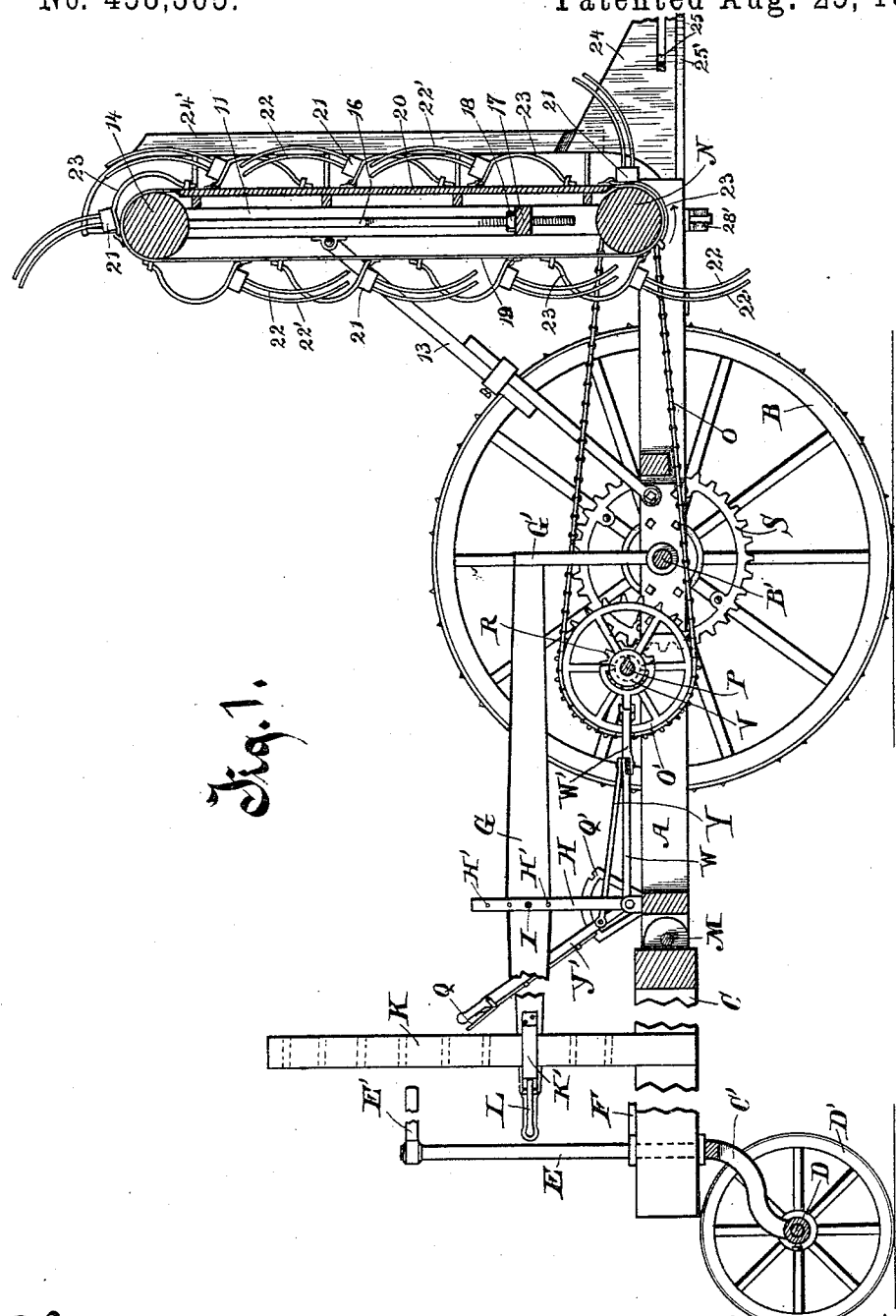

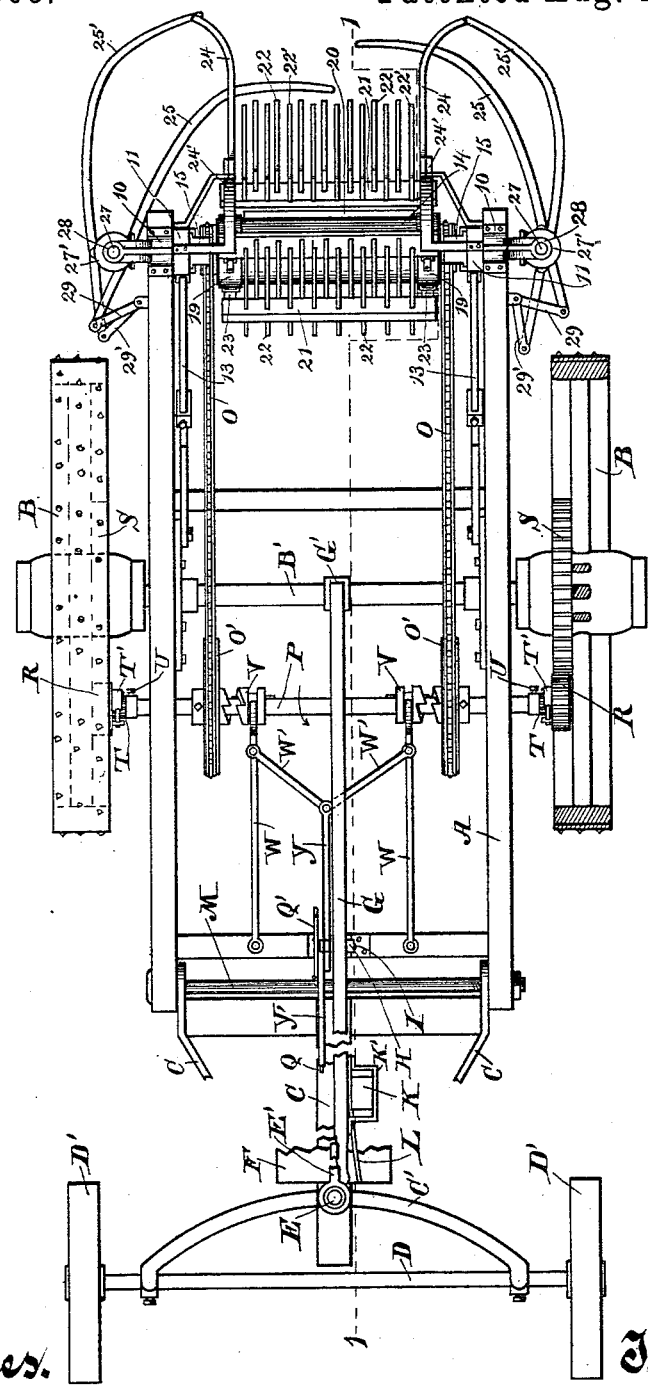

UNITED STATES PATENT OFFICE.

WILLIS W. HARVEY, OF DEXTER, MINNESOTA.

CORN-HARVESTER.

SPECIFICATION forming part of Letters Patent No. 458,365, dated August 25, 1891.

Application filed October 27, 1890. Serial No. 369,461. (No model.)

*To all whom it may concern:*

Be it known that I, WILLIS W. HARVEY, of Dexter, in the county of Mower and State of Minnesota, have invented a new and useful Improvement in Corn-Pickers, of which the following is a description, reference being had to the accompanying drawings, which are a part of this specification.

My invention relates to a machine organized and constructed for picking corn from stalks standing in the field. The machine is arranged to pick the ears from a row of stalks which it straddles while being pushed forward ahead of the team hitched to it.

The novel features of the device will be hereinafter claimed.

In the drawings, Figure 1 is a longitudinal vertical section on line 1 1 of Fig. 2, parts being broken away and omitted for convenience of illustration. Fig. 2 is a top plan view of the machine, parts being broken away and omitted and other parts shown in section for convenience of illustration. Fig. 3 is a front elevation of that part of the machine which is particularly adapted for picking the ears of corn from the stalks. Fig. 4 is a detail, being an elevation of that part of the machine shown n Fig. 3 at the right of the line 4 4. Fig. 5 is a detail of the pinion, rack, and pawl on the driving-shaft.

A is the main frame, supported and carried on the wheels B B, loose on the fixed axle B'. The wheels have wide tires with roughened or spiked surfaces to adapt them for traveling on soft or hard smooth ground.

The frame is provided with a rearwardly-projecting tongue C, pivoted at its rear end to a yoke C', fixed to an axle D, provided with supporting and guiding wheels D' D'. The yoke C' is provided centrally with a post E, which passes through the tongue C, serving as the pivot by which the tongue is connected to the yoke, which post is provided with a lever-handle E'. The handle E' is turned toward the front, and is at such height that the driver may stand alongside or straddle of it on the platform F, fixed on the tongue C.

In front of the driver there is a horizontal lever-handle G, fixed at its front end in a post G', which is pivoted on the axle B'. The lever-handle G is arranged to be adjustably secured to the frame through an arm H, hinged on the frame A by a pin I, inserted through the arm and through the lever-handle. The pin may be inserted in any of the several apertures H' H' in the arm. The lever-handle G is also arranged to tilt beside and be guided by the standard K, fixed on the tongue, the lever-handle G being provided with a loop-guide K', affixed thereto, which passes around the standard K, and with the lever-handle is movable vertically thereon. A spring-latch L, secured to the lever-handle G, is adapted to engage a rack on the standard K, whereby the lever-handle is locked in position to the standard. The tongue C is hinged to the frame by the bolt or rod M, passing through the rear end of the frame and through the front end or hounds of the tongue, and through this construction the driver is able, by lifting or depressing the handle G, to depress or raise the front end of the machine, as desired.

The corn-picking mechanism specifically is located at the front end of the frame, and is operated directly or indirectly through the shaft N, which shaft is connected by sprocket-chains O O, running on proper wheels therefor, to the driving-shaft P, which shaft is journaled on the frame and is provided with pinions R R, meshing with cog-wheels S S, fixed to the wheels B B. The pinions R R are loose on the shaft P, being held to rotation therewith, when the wheels B B rotate forwardly, by means of the spring-pawls T' T' thereon engaging the ratchets T T, secured permanently to the shaft P by means of set-screws U U, turning through flange-collars on the ratchet-wheels. The sprocket-wheels O' O' are loose on the shaft P, but are arranged to be geared thereto for rotation in one direction by the eccentric clutches V V, feathered on the shaft P, which clutches are thrown into and out of engagement with the hubs of the sprocket-wheels O' O' by means of the shifting-rods W W, which are hinged at their rear ends to the frame and at their front ends ride in grooves therefor in the clutches, the front ends of the rods W W being connected together movably by the oblique rods W' W', which at their inner ends are pivoted to the connecting-rod Y, which at its rear end is pivoted medially to the tilting lever-handle Y', fulcrumed at its lower end on the frame A. A spring-latch Q on the lever-handle Y' is arranged to engage a segmental rack Q', fixed on the frame, and lock the clutches in position. This construction for throwing the sprocket-wheels O' O' into and out of gear with the driving-shaft P provides for the movement forward or travel of the machine without operating the specific picker mechanism.

The picker mechanism specifically consists of the following parts and construction: The shaft N has its journal-bearings in boxes 10 10, fixed on the side rails of the frame A. The side rails 11 11 of the upwardly-extending picker-frame rest on annular flanges projecting inwardly from the boxes 10 10, to which flanges the rails 11 11 are secured by straps 12 12, fastened rigidly at their ends to the rails 11 11 and passing medially around the flanges on the boxes, thereby hinging the picker-frame to the main frame. The picker-frame is supported in an upright or oblique position adjustably by the medially-adjustable brace-rods 13 13, pivoted at their upper ends to the picker-frame and at their lower ends rearwardly therefrom to the main frame. A roller 14 is journaled in adjustable boxes 15 15, sliding in ways therefor on the rails 11 11 endwise thereof, which boxes are provided with a bifurcated adjusting-rod 16, which passes through a cross-bar 17 of the frame and is provided with a nut 18, turning thereon against the cross-bar, whereby the distance of the roller 14 from the shaft N is adjusted. Endless belts 19 19 are carried on the shaft N and roller 14. A table or wall-board 20, fixed on the frame, is located about in the plane of the front surface of the shaft N and roller 14 and extends nearly from one to the other. The belts 19 19 in the line of their upward movement lie upon or close to this wall-board 20. Curved strap-springs 23 23, in pairs opposite each other, are secured at their front ends to the belts, and their free ends are movable in loops fixed on the belts. A series of cross-bars 21 are secured to the springs 23, one cross-bar to each pair of springs, the cross-bars being located at a little distance from the front ends of the springs. Each of these cross-bars is provided with a number of curved outwardly-projecting teeth 22 22', fixed in two rows in the outer surfaces of the cross-bars, the teeth being arranged at little distances apart and staggered—that is, the teeth of the two rows alternating with each other, one row being set a little in front of the other row. The construction and arrangement of the springs and cross-bars are such that the springs, when the belts are running on straight lines between the shaft N and the roller 14, hold the cross-bars yieldingly away from the belts with the free ends of the teeth 22 tilted toward and nearly to the plane of the belts. These springs 23 are so curved as substantially to fit about the shaft N and roller 14 when passing them, where the belts turn about the shaft and roller, whereby the under surfaces of the cross-bars are let down against the belts, and the teeth 22 are thrown out radially from the shaft and roller, as shown in Fig. 1. In this position the teeth at the bottom of the picker-frame as they are carried around the shaft in the direction of the arrow project outwardly therefrom and receive the stalks and ears thereon between them, and as the cross-bars start on the straight upward movement of the belts the springs resume their curved position with reference to the belts and forcibly and quickly tilt the cross-bars and teeth upwardly and inwardly toward the wall 20, whereby, and more readily with the oblique action of the alternately front and rear located teeth in the cross-bar, the ears are broken from the stalks and are then carried upwardly by the teeth and cross-bars alongside of the wall 20 to the roller 14, over which they are carried and thrown rearwardly therefrom into a suitable receptacle just as the cross-bars leave the roller 14 at its rear. The springs 23 23 are but slightly elastic, and rigid bars, if properly made and fitted to the mechanism, would serve the purpose as substantial equivalents for the springs.

Forwardly-projecting and outwardly-curved wings 24, one at each side, fixed to the main frame, serve for guides to receive and guide the spreading or leaning stalks to the teeth 22.

Curved fingers 25 25' in pairs, two on each side, are pivoted medially on the diametrically-opposite cranks 26 26' of shafts 27. These shafts 27 are journaled in brackets 28 28', the brackets 28 being formed integrally on boxes 10 and the brackets 28' being secured directly underneath to the frame A. The fingers 25 25' are hinged to the frame through connecting-rods 29 29'. The shafts 27 are provided with pinions 27', gearing with pinions on the shaft N. The location and arrangement of the fingers 25 25' and the cranks 26 26' at the two sides of the machine are such that the fingers are successively thrown in front of the teeth 22 and moved rearwardly toward them and then carried outwardly laterally and forwardly to be again thrown in front of the teeth to repeat the movement.

Side boards 24' 24', fixed to the picker-frame and located alongside the picker-teeth belts, are adapted to prevent ears of corn from falling or being thrown off the teeth laterally while they are being carried up over the roller 14. An endless apron as wide as the length of the cross-bars 21, forming the belt or attached to the belts to which the cross-bars are secured, would serve the purpose of the table or wall 20 as a back for retaining the ears of corn when being elevated in the picker-teeth, though I consider the wall 20 the more substantial and better construction.

The tongue C in the drawings is broken away and parts are omitted, so that the parts of the machine in front and at the rear of the tongue are brought much nearer together than they are normally, the tongue being of sufficient length to permit the team, one horse on each side of it, to be attached thereto facing toward the front or picker portion of the machine, which is pushed forward by the team ahead of them.

What I claim as new, and desire to secure by Letters Patent, is—

1. In a corn-picker, an endless conveyer running substantially vertically and driven by the traction-wheels of the machine, cross-bars hinged to the conveyer, and picker-teeth fixed in the cross-bars and adapted to be folded upon and swung outwardly from the conveyer, all combined substantially as described.

2. In a corn-picker, an endless conveyer carried in an adjustably upright frame, curved rods in pairs attached at one end to and bearing at the other end against the conveyer, cross-bars fixed to the rods at a little distance from their ends, and teeth in rows in the cross-bars arranged to be thrown out from the conveyer and folded thereto by the action of the rods, substantially as described.

3. In a corn-picker, an endless conveyer traveling substantially vertically in a frame, picker-teeth inserted in two staggered rows in cross-bars on the conveyer, whereby they are adapted to catch and break off ears of corn by tilting them, and means for automatically throwing the teeth outwardly radially to the line of motion of the conveyer and for closing them inwardly to the conveyer, all combined as set forth.

4. In a corn-picker, the combination of a frame, a conveyer traveling substantially vertically and carrying teeth thereon arranged to be thrown out radially to receive the stalks of standing corn therein and folded inwardly, rigid guide-wings secured to the frame, projecting to the front on each side of the picker-teeth, and side boards or guides fixed to the frame alongside of the conveyer between and in front of its shaft and roller, substantially as described.

5. In a corn-picker, the combination of a frame supporting a conveyer, the conveyer having teeth arranged to be thrown out radially to remove ears of corn from standing stalks and to be closed inwardly, and a table or wall forming a back for the front line of the conveyer between the shaft and roller at its respective ends, against which the ears of corn are held and forced upwardly by the picker-teeth, substantially as described.

6. In a corn-picker, a main frame, picker-teeth on a conveyer moving substantially vertically, the teeth being arranged to project forwardly in a horizontal plane to receive the stalks and corn, and a shaft journaled in the frame on which the picker-conveyer is carried and by which it is driven, in combination with forwardly-projecting and outwardly-curving rigid guide-wings having horizontal slots, the wings being located at the sides and in front of the ascending picker-teeth, forwardly-projecting inwardly-curving gathering-fingers, two on each side of the machine, arranged to move through the slots in the guide-wings and to pass in front of and be drawn toward the picker-teeth, doubly-cranked shafts journaled in the frame, one at each side of the machine, which shafts are geared to and are driven by the picker-teeth conveyer-shaft, the cranks being arranged at different radial angles in the shafts, on which cranks the gathering-fingers are pivoted medially, and links connecting the rear ends of the gathering-fingers movably to the frame, substantially as described.

7. In a corn-picker having a main frame, the combination, with a driving-shaft journaled in the frame and geared to the wheels of the frame and carrying loose thereon wheels connected mechanically to the operative picker mechanism, of sleeves or clutches feathered on the driving-shaft, rods hinged on the frame and riding in grooves in the clutches, and oblique connecting-rods pivoted at one end to the hinged clutch-actuating rods and at the other end to a tilting hand-lever, substantially as described.

In testimony whereof I affix my signature in presence of two witnesses.

WILLIS W. HARVEY.

Witnesses:
J. W. RISING,
G. W. EASTMAN.